(12) United States Patent
Teramoto (10) Patent No.: US 11,237,684 B2
(45) Date of Patent: *Feb. 1, 2022

(54) TOUCH DETECTION DEVICE

(71) Applicant: Japan Display Inc., Tokyo (JP)

(72) Inventor: Masahiro Teramoto, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,434

(22) Filed: Mar. 27, 2020

(65) Prior Publication Data

US 2020/0225803 A1 Jul. 16, 2020

Related U.S. Application Data

(63) Continuation of application No. 16/019,717, filed on Jun. 27, 2018, now Pat. No. 10,642,411, which is a
(Continued)

(30) Foreign Application Priority Data

Nov. 4, 2011 (JP) .................................. 2011-241848

(51) Int. Cl.
*G06F 3/044* (2006.01)
*G06F 3/041* (2006.01)
(52) U.S. Cl.
CPC .......... *G06F 3/0446* (2019.05); *G06F 3/0412* (2013.01); *G06F 3/0443* (2019.05);
(Continued)
(58) Field of Classification Search
CPC ........ G06F 3/041; G06F 3/044; G06F 3/0443; G06F 3/0412; G06F 3/0446; G06F 2203/04111; G06F 2203/04112
See application file for complete search history.

(56) References Cited

U.S. PATENT DOCUMENTS

2009/0085885 A1* 4/2009 Wu .................... G06F 3/0445
345/173
2009/0262096 A1 10/2009 Teramoto
(Continued)

FOREIGN PATENT DOCUMENTS

GB 2168816 A 6/1986
JP 2009265748 A 11/2009
(Continued)

OTHER PUBLICATIONS

Chinese Office Action dated Mar. 31, 2015 regarding counterpart Chinese Patent Application No. 201210434197.0.
(Continued)

*Primary Examiner* — Towfiq Elahi
(74) *Attorney, Agent, or Firm* — Michael Best & Friedrich LLP (57) ABSTRACT

A touchscreen includes a plurality of X electrodes extending in a first direction and arranged in parallel in a second direction, a plurality of Y electrodes extending in the second direction so as to intersect the X electrodes and arranged in parallel in the first direction, and pedestal layers formed at respective intersections between the plurality of X electrodes and the plurality of Y electrodes, wherein an intersection portion of each Y electrode is formed under the pedestal layer, wherein a part of an intersection portion of each X electrode is formed on the pedestal layer and both ends thereof are electrically connected to adjacent electrode portions of the X electrodes, and wherein a profile of a portion of the pedestal layer intersecting the intersection
(Continued)

portion of the X electrode has a nonlinear shape when viewed from a direction perpendicular to the substrate.

20 Claims, 6 Drawing Sheets

Related U.S. Application Data continuation of application No. 15/259,977, filed on Sep. 8, 2016, now Pat. No. 10,031,617, which is a continuation of application No. 14/719,415, filed on May 22, 2015, now Pat. No. 9,465,498, which is a continuation of application No. 13/667,019, filed on Nov. 2, 2012, now Pat. No. 9,134,861.

(52) U.S. Cl.
CPC ............... *G06F 2203/04111* (2013.01); *G06F 2203/04112* (2013.01)

(56) References Cited

U.S. PATENT DOCUMENTS

| | | | |
|---|---|---|---|
| 2010/0220076 A1* | 9/2010 | Nagata | G06F 3/044 345/174 |
| 2011/0018838 A1 | 1/2011 | Lee | |
| 2011/0128246 A1 | 6/2011 | Esaka et al. | |
| 2011/0248953 A1 | 10/2011 | Lee et al. | |

FOREIGN PATENT DOCUMENTS

| | | |
|---|---|---|
| JP | 2010-231299 A | 10/2010 |
| JP | 2011-013725 A | 1/2011 |
| JP | 2011-076155 A | 4/2011 |
| JP | 2011-076365 A | 4/2011 |
| JP | 2011-090237 A | 5/2011 |
| JP | 2011-164887 A | 8/2011 |
| JP | 2011-191847 A | 9/2011 |
| JP | 2011-192252 A | 9/2011 |
| WO | 2011052335 A1 | 5/2011 |
| WO | 2011/081112 A1 | 7/2011 |

OTHER PUBLICATIONS

Japanese Office Action dated Oct. 13, 2015 regarding counterpart Japanese Patent Application No. 2011-241848, with partial translation.

Japanese Office Action for the corresponding Japanese Patent Application No. 2017-202306 with machine translation.

Japanese Office Action dated Jul. 2, 2019 for the corresponding Japanese Patent Application No. 2018-208039, with English machine translation.

Japanese Office Action dated Sep. 3, 2019 for the corresponding Japanese Patent Application No. 2018-208039, with partial English translation.

\* cited by examiner

PRIOR ART

TOUCH DETECTION DEVICE

CROSS-REFERENCE TO RELATED APPLICATIONS

This application is a continuation of U.S. patent application Ser. No. 16/019,717 filed on Jun. 27, 2018, which, in turn, is a continuation of Ser. No. 15/259,977 (now U.S. Pat. No. 10,031,617) filed on Sep. 8, 2016, which, in turn, is a continuation of U.S. patent application Ser. No. 14/719,415 (now U.S. Pat. No. 9,465,498) filed on May 22, 2015, which, in turn, is a continuation of U.S. patent application Ser. No. 13/667,019 (now U.S. Pat. No. 9,134,861) filed on Nov. 2, 2012. Further, this application claims priority from Japanese patent application JP 2011-241848 filed on Nov. 4, 2011, the entire contents of which are hereby incorporated by reference into this application.

BACKGROUND OF THE INVENTION

1. Field of the Invention

The present invention relates to a touchscreen, and particularly to a touchscreen capable of reducing that a pattern of an electrode intersection portion is seen.

2. Description of the Related Art

As main types of a touchscreen, a type of detecting variations in light and a type of detecting variations in electrical characteristics are known. In addition, as the type of detecting variations in electrical characteristics, a capacitance coupling type is known.

As a capacitance coupling type touchscreen in the related art, as disclosed in JP 2009-265748A or the like, a touchscreen which has a plurality of X electrodes and a plurality of Y electrodes intersecting the X electrodes is known.

In the above-described touchscreen disclosed in JP 2009-265748A or the like, the Y electrodes are formed in an electrode pattern where an intersection portion and an electrode portion wider than the intersection portion are alternately disposed in a plurality, and the X electrodes are formed in an electrode pattern where an intersection portion and an electrode portion wider than the intersection portion are alternately disposed in a plurality.

In addition, the intersection portion of the Y electrode, the electrode portion of the Y electrode, and the electrode portion of the X electrode are formed on a substrate. Further, an intersection portion of the X electrode is formed on an insulating interlayer formed on the substrate, and both ends of the intersection portion of the X electrode are respectively electrically connected to the adjacent electrode portions of the X electrodes via a contact hole formed in the insulating interlayer. Furthermore, the X electrode and the Y electrode are made of a material with high transmittance, for example, a transparent conductive material such as ITO (Indium Tin Oxide).

However, in the capacitance coupling type touchscreen in the related art, when viewed from a specific direction, the contact hole portion is recognized by a user due to reflection at the contact hole portion, and thereby there is a problem in that visual quality deteriorates.

SUMMARY OF THE INVENTION

The present invention has been made in order to solve the above-described problem, and an object of the present invention is to provide a technique capable of reducing that a pattern of an electrode intersection portion is recognized by a user due to reflection in a touchscreen.

The above-described and other objects and novel features of the present invention will become apparent through the description of the present specification and the accompanying drawings.

An outline of the invention disclosed in the present specification is described representatively and briefly as follows.

(1) A touchscreen including a substrate; a plurality of X electrodes that extend on the substrate in a first direction and are arranged in parallel in a second direction intersecting the first direction; a plurality of Y electrodes that extend on the substrate in the second direction so as to intersect the X electrodes and are arranged in parallel in the first direction; and pedestal layers that are formed at respective intersections between the plurality of X electrodes and the plurality of Y electrodes, wherein each of the Y electrodes includes an intersection portion intersecting the X electrode and an electrode portion formed in the same layer as the X electrode so as to be separated from the X electrode, wherein each of the X electrodes includes an intersection portion intersecting the Y electrode and an electrode portion formed in the same layer as the Y electrode so as to be separated from the Y electrode, wherein the intersection portion of each Y electrode is formed under the pedestal layer, wherein a part of the intersection portion of each X electrode is formed on the pedestal layer and both ends thereof are electrically connected to adjacent electrode portions of the X electrodes, and wherein a profile of a portion of the pedestal layer intersecting the intersection portion of the X electrode has a nonlinear shape when viewed from a direction perpendicular to the substrate.

(2) The touchscreen in (1), wherein a profile of the pedestal layer is a polygonal shape of which the number of sides is equal to or more than a pentagonal shape when viewed from a direction perpendicular to the substrate.

(3) The touchscreen in (1), wherein a profile of the pedestal layer is a circular shape when viewed from a direction perpendicular to the substrate.

(4) The touchscreen in (2) or (3), wherein both ends of the electrode portion of the Y electrode in the first direction and both ends of the electrode portion of the X electrode in the second direction are formed under the pedestal layer.

(5) The touchscreen in (1), wherein the pedestal layer has an elliptical shape of which a long axis direction is an extending direction of the intersection portion of the X electrode when viewed from a direction perpendicular to the substrate.

(6) The touchscreen in (5), wherein both ends of each of the electrode portions of the plurality of X electrodes in the second direction are formed under the pedestal layer.

(7) The touchscreen in any one of (1) to (6), wherein the pedestal layer is formed in a tapered shape of which a thickness of a side surface gradually increases toward a planarized portion on an opposite side to a surface coming into contact with the substrate.

(8) The touchscreen in any one of (1) to (7), further including an index matching layer that is formed on the substrate, wherein the X electrodes, the Y electrodes, and the pedestal layers are formed on the index matching layer.

(9) The touchscreen in any one of (1) or (8), wherein the electrode portion of the X electrode and the electrode portion of the Y electrode have a rhombic shape when viewed from the direction perpendicular to the substrate.

(10) The touch panel in any one of (1) to (9), further including a protective layer that is formed so as to cover the X electrodes and the Y electrodes.

Description of effects which can be achieved by the representative invention disclosed in the present specification is as follows.

According to the touchscreen of the present invention, it is possible to reduce that a pattern of an electrode intersection portion is recognized by a user due to reflection.

DETAILED DESCRIPTION OF THE INVENTION

Hereinafter, embodiments of the present invention will be described in detail with reference to the accompanying drawings.

In addition, constituent elements with the same function are given the same reference numeral throughout the drawings for describing the embodiments, and repeated description thereof will be omitted. Further, the following embodiment is not intended to construe the claims of the present invention in a limited sense.

Schematic configuration of display device with touchscreen

Figure 7:
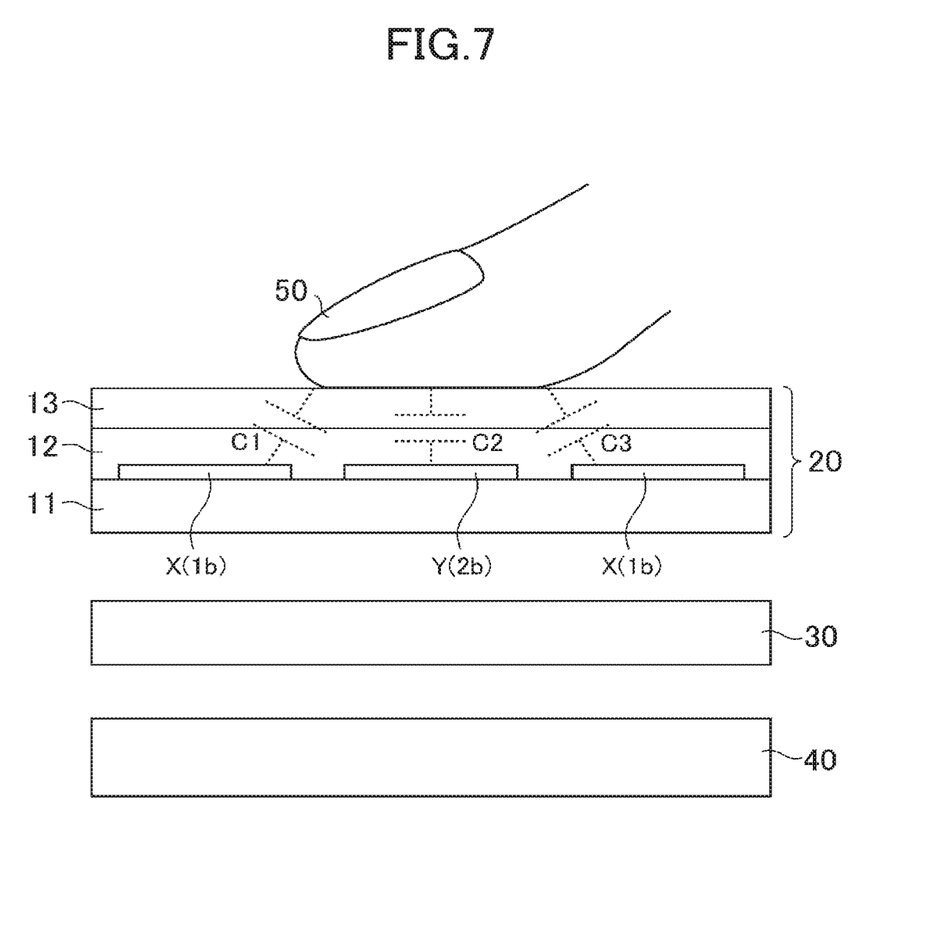
FIG. 7 is a side view illustrating a schematic configuration of a display device with a touchscreen.

FIG. 7 is a side view illustrating a schematic configuration of a display device with a touchscreen. In addition, FIG. 7 shows a case where the display panel is a liquid crystal display panel 30.

The display device with a touchscreen shown in FIG. 7 includes the liquid crystal display panel 30, a capacitance coupling type touchscreen 20 disposed on a surface on an observer side of the liquid crystal display panel 30, and a backlight 40 disposed under a surface on an opposite side to the observer side of the liquid crystal display panel 30.

As the liquid crystal display panel 30, a liquid crystal display panel of, for example, an IPS type, a TN type, a VA type, or the like, is used.

The touchscreen 20 includes a plurality of X electrodes which extend in a first direction and are arranged in parallel with a predetermined arrangement pitch in a second direction intersecting the first direction, and a plurality of Y electrodes which extend in the second direction so as to intersect the X electrodes and are arranged in the first direction with a predetermined arrangement pitch.

Further, FIG. 7 schematically shows a case where capacitors C1 and C3 are formed between the finger 50 of an observer and the X electrodes, and a capacitor C2 is formed between the finger 50 of the observer and the Y electrode. The touchscreen 20 shown in FIG. 7 detects a capacitance difference between coupling capacitances of the X electrode and the Y electrode, and detects touched position coordinates in a touch plane of the touchscreen 20, which are touched by the finger 50 of the observer.

[Touchscreen in the Related Art]

Figure 4:
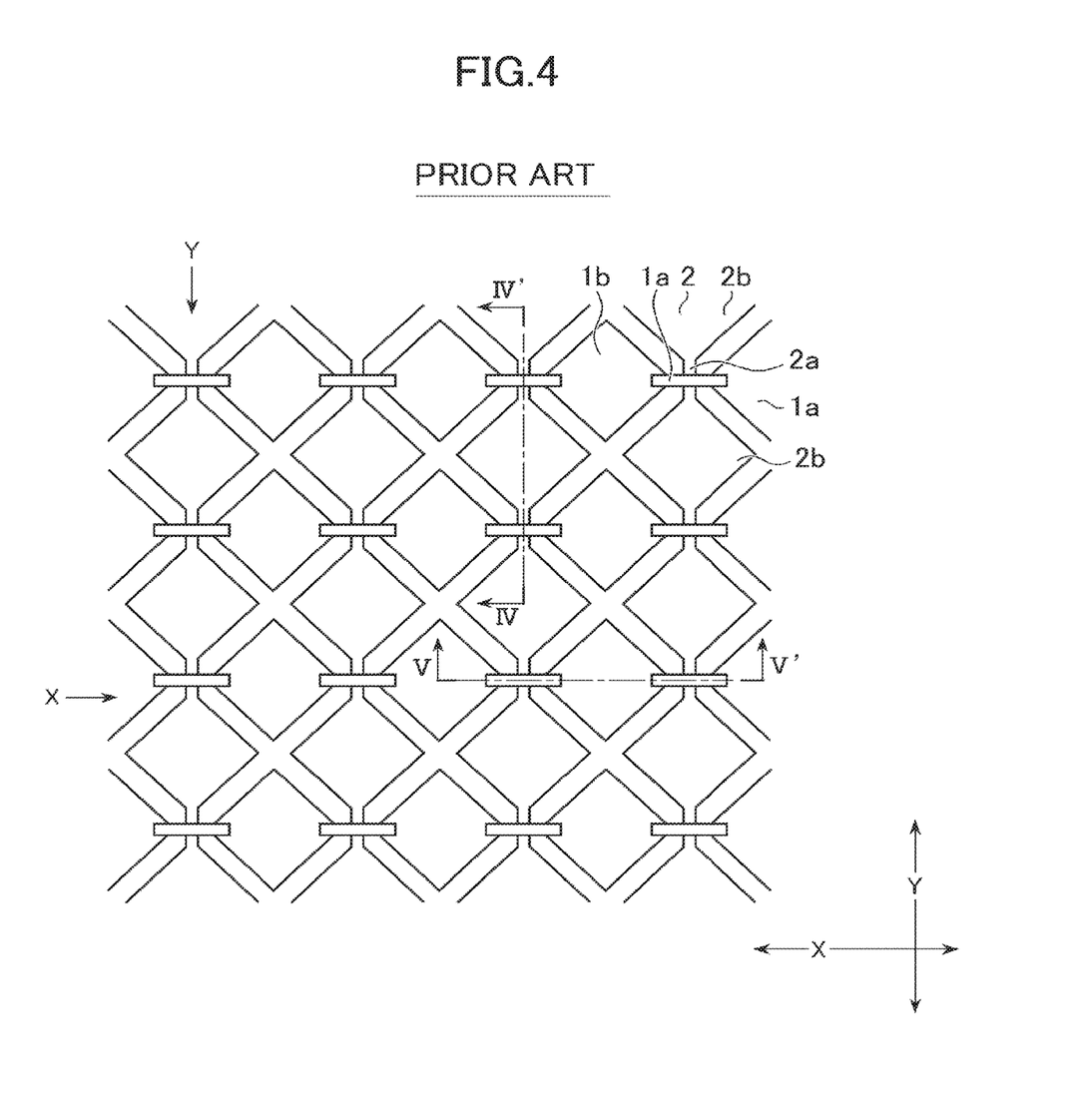
FIG. 4 is a plan view illustrating an electrode pattern of a touchscreen of a display device with the touchscreen in the related art.
Figure 5:
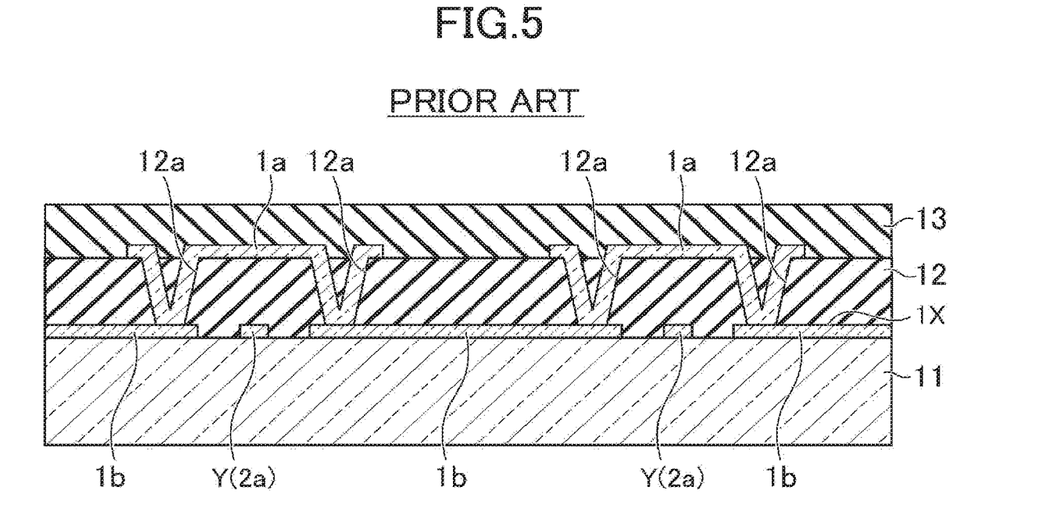
FIG. 5 is a cross-sectional view illustrating a cross-sectional structure taken along the line V-V' shown in FIG. 4.
Figure 6:
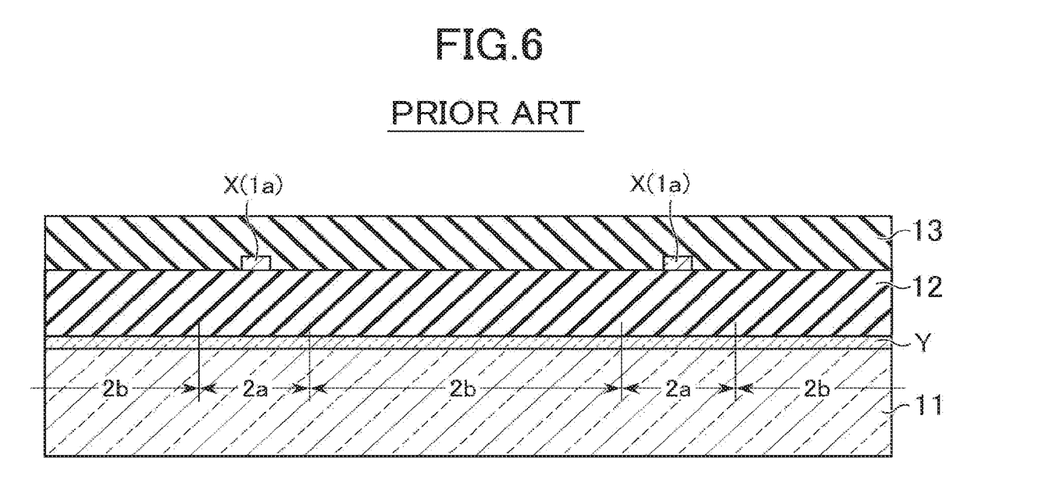
FIG. 6 is a cross-sectional view illustrating a cross-sectional structure taken along the line VI-VI' shown in FIG. 4.

FIGS. 4 to 6 are diagrams illustrating a capacitance coupling type touchscreen in the related art, wherein FIG. 4 is a plan view illustrating an electrode pattern of the capacitance coupling type touchscreen in the related art; FIG. 5 is a cross-sectional view illustrating a cross-sectional structure taken along the line V-V' shown in FIG. 4; and FIG. 6 is a cross-sectional view illustrating a cross-sectional structure taken along the line VI-VI' shown in FIG. 4.

The capacitance coupling type touchscreen in the related art includes a plurality of X electrodes which extend in a first direction (for example, the X direction) and are arranged in parallel with a predetermined arrangement pitch in a second direction (for example, the Y direction) intersecting the first direction, and a plurality of Y electrodes which extend in the second direction so as to intersect the X electrodes and are arranged in the first direction with a predetermined arrangement pitch.

The plurality of Y electrodes are formed in an electrode pattern where an intersection portion 2a and an electrode portion 2b wider than the intersection portion 2a are alternately disposed in a plurality in the second direction. The plurality of Y electrodes are disposed on a surface of a substrate 11 on the observer side and are covered by an insulating layer 12 which is formed thereon. As the substrate 11, a transparent insulating substrate such as, for example, glass is used.

The plurality of X electrodes are formed in an electrode pattern where an intersection portion 1a and an electrode portion 1b wider than the intersection portion 1a are alternately disposed in a plurality in the first direction. The intersection portion 1a of each of the plurality of X electrodes is formed in a layer different from the Y electrode and planarly intersects the intersection portion 2a of each of the Y electrodes. The electrode portion 1b of the plurality of X electrodes is formed in the same layer as the electrode portion 2b of each of the Y electrodes so as to be separated from the Y electrodes. Here, the electrode portion 1b of the X electrode and the electrode portion 2b of the Y electrode have a rhombic shape when viewed from the direction perpendicular to the substrate 11.

The electrode portion 1b of each of the plurality of X electrodes is covered by the insulating layer 12 in the same manner as the Y electrode. The intersection portion 1a of each of the plurality of X electrodes is disposed on the insulating layer 12 and is covered by a protective layer 13 which is formed thereon.

The intersection portion 1a of the X electrode planarly intersects the intersection portion 2a of the Y electrode, and is electrically and mechanically connected to two adjacent electrode portions 1b with the intersection portion 2a interposed therebetween via contact holes 12a formed in the insulating layer 12 which is an insulating interlayer between the intersection portion 1a of the X electrode and the Y electrode.

In plan view, the electrode portion 2b of the Y electrode is disposed between the two adjacent intersection portions 1a of the X electrode, and the electrode portion 1b of the X electrode is disposed between the two adjacent intersection portions 2a of the Y electrode.

In addition, the X electrode and the Y electrode are made of a material having high transmittance, for example, a transparent conductive material such as ITO (Indium Tin Oxide).

However, in the capacitance coupling type touchscreen in the related art, there is a problem in that, when the touchscreen is viewed from a specific direction, the contact hole portion is recognized by a user due to reflection at the contact hole portion, and thus visual quality deteriorates.

Embodiment

Figure 1A:
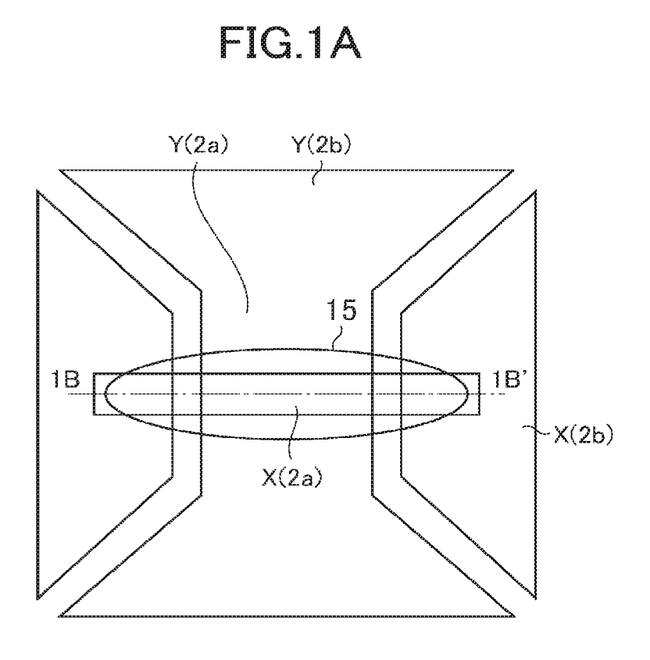
FIG. 1A is a plan view of an electrode intersection portion of a touchscreen according to an embodiment of the present invention.
Figure 1B:
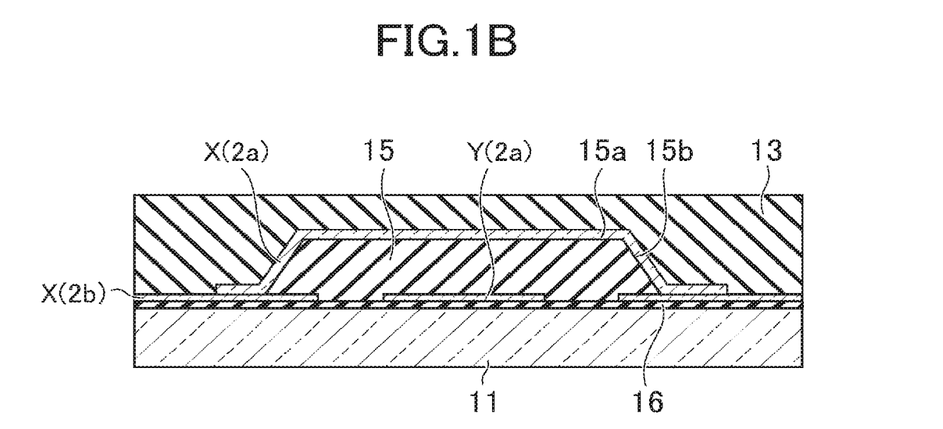
FIG. 1B is a cross-sectional view illustrating a cross-sectional structure taken along the line 1B-1B' of FIG. 1A.

FIGS. 1A and 1B are diagrams illustrating a touchscreen according to an embodiment of the present invention, wherein FIG. 1A is a plan view of an electrode intersection portion, and FIG. 1B is a cross-sectional view illustrating a cross-sectional structure taken along the line 1B-1B' of FIG. 1A.

In the present embodiment as well, as shown in FIG. 4, the touchscreen includes a plurality of X electrodes which extend in a first direction (for example, the X direction) and are arranged in parallel with a predetermined arrangement pitch in a second direction (for example, the Y direction) intersecting the first direction, and a plurality of Y electrodes which extend in the second direction so as to intersect the X electrodes and are arranged in the first direction with a predetermined arrangement pitch.

The plurality of Y electrodes are formed in an electrode pattern where an intersection portion 2a and an electrode portion 2b wider than the intersection portion 2a are alternately disposed in a plurality in the second direction. The plurality of Y electrodes are disposed on a surface of a substrate 11 on the observer side and are covered by a protective layer 13 which is formed thereon. As the substrate 11, a transparent insulating substrate such as, for example, glass is used.

The plurality of X electrodes are formed in an electrode pattern where an intersection portion 1a and an electrode portion 1b wider than the intersection portion 1a are alternately disposed in a plurality in the first direction. The intersection portion 1a of each of the plurality of X electrodes is formed so as to stride over a pedestal layer 15 and planarly intersects the intersection portion 2a of each of the Y electrodes. The electrode portion 1b of each of the plurality of X electrodes is formed in the same layer as the electrode portion 2b of each of the Y electrodes so as to be separated from the Y electrodes.

The plurality of X electrodes are covered by the protective layer 13 which is formed thereon. In addition, the electrode portion 1b of the X electrode and the electrode portion 2b of the Y electrode have a rhombic shape when viewed from the direction perpendicular to the substrate 11.

In the present embodiment, the pedestal layer 15 is formed at a part where the intersection portion 1a of the X electrode intersects the intersection portion 2a of the Y electrode. The pedestal layer 15 has a profile of an elliptical shape in plan view.

As described above, the intersection portion 1a of the X electrode is formed so as to stride over the pedestal layer 15. Thereby, the intersection portion 1a of the X electrode planarly intersects the intersection portion 2a of the Y electrode, and is electrically and mechanically connected to two adjacent electrode portions 1b of the X electrode with the intersection portion 2a interposed therebetween.

In plan view, the electrode portion 2b of the Y electrode is disposed between the two adjacent intersection portions 1a of the X electrode, and the electrode portion 1b of the X electrode is disposed between the two adjacent intersection portions 2a of the Y electrode. In addition, the X electrode and the Y electrode are made of a material having high transmittance, for example, a transparent conductive material such as ITO (Indium Tin Oxide).

As described above, the present embodiment is characterized in that the pedestal layer 15 is provided at the part where the intersection portion 1a of the X electrode intersects the intersection portion 2a of the Y electrode in order to omit the contact hole 12a formed in the insulating layer 12 in the touchscreen in the related art.

Here, the pedestal layer 15 is formed in a tapered shape where the thickness of the side surface 15b gradually increases toward the planarized portion 15a on an opposite side to the surface coming into contact with the substrate 11.

In the present embodiment, the contact hole 12a formed in the insulating layer 12 is omitted from the touch panel in the related art by providing the pedestal layer 15 at the portion where the intersection portion 1a of the X electrode intersects the intersection portion 2a of the Y electrode. Therefore, it is possible to solve the problem that, when viewed from a specific direction, the contact hole portion is recognized by a user due to reflection at the contact hole portion and thereby visual quality deteriorates.

However, at the side surface 15b with a tapered shape of the intersection portion 1a of the X electrode formed so as to cover the pedestal layer 15, reflectance is increased than the surroundings and reflection becomes obvious, including optical interference, and particularly, it is expected that visual quality in the reflection deteriorates.

As shown in FIG. 1B, it is possible to reduce the interference by adding an index matching layer 16; however, visual quality deterioration at the side surface 15b with a tapered shape due to reflection cannot be reduced.

Figure 3A:
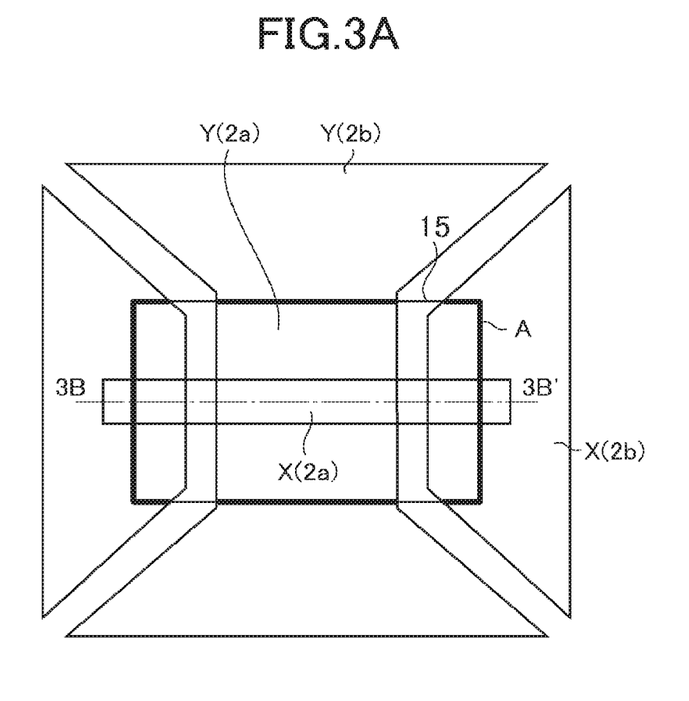
FIG. 3A is a plan view of the electrode intersection portion illustrating effects of the touchscreen according to the embodiment of the present invention.
Figure 3B:
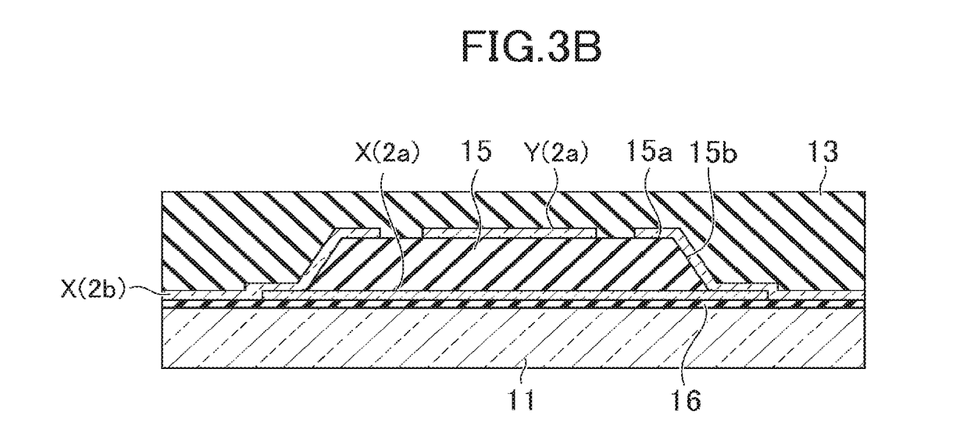
FIG. 3B is a cross-sectional view illustrating a cross-sectional structure taken along the line 3B-3B' of FIG. 3A.

The deterioration in the visual quality due to reflection is caused by the side surface 15b with a tapered shape, and is caused by reflected light at each side surface 15b having directionality in a direction perpendicular to each side surface 15b, in a case where a profile of the pedestal layer 15 is a rectangular shape, as shown in FIG. 3B.

Therefore, in the present embodiment, a profile of the pedestal layer 15 when viewed from the direction perpendicular to the substrate 11 is characterized in an elliptical shape of which the long axis direction is an extending direction of the intersection portion 1a of the X electrode. Thereby, the side surface 15b with a tapered shape becomes a nonlinear shape which is a convex shape with respect to the reflection direction so as to diffuse reflected light at the side surface 15b and decrease a difference between luminance due to the reflected light at the side surface 15b and surrounding luminance, and thereby it is possible to reduce that the pattern of the electrode intersection portion is seen.

Here, preferably, the smaller the area of the pedestal layer 15 is, the further achieved the improvement effect is; however, the area cannot be too small due to a restriction of a resistance value of the X electrode.

Further, in the present embodiment, for the above-described reasons, when viewed from the direction perpendicular to the substrate 11, it is clear that a shape of the part intersecting the intersection portion 1a of the X electrode in the pedestal layer 15 is preferably a nonlinear shape.

Figure 2:
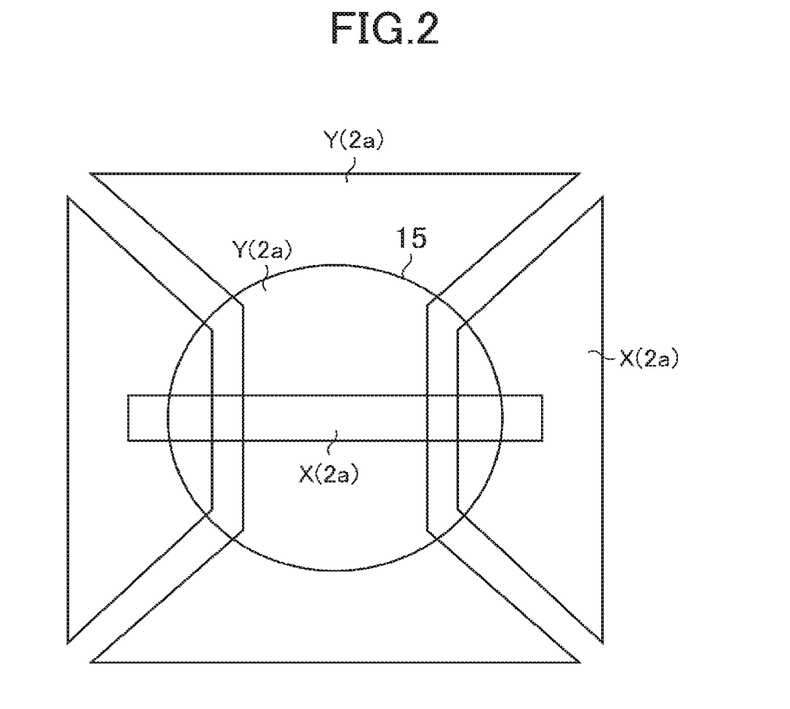
FIG. 2 is a diagram illustrating a modified example of the touchscreen according to the embodiment of the present invention.

Further, a profile of the pedestal layer 15 when viewed from the direction perpendicular to the substrate 11 is not limited to an elliptical shape, and may be an obtuse polygonal shape, or may be a circular shape as shown in FIG. 2. In addition, FIG. 2 is a diagram illustrating a modified example of the pedestal layer 15 according to the present embodiment and is a plan view of the electrode intersection portion.

Further, although the intersection portion 2a of the Y electrode is formed under the pedestal layer 15, and the intersection portion 1a of the X electrode is formed on the pedestal layer 15 in FIG. 1B, the intersection portion 1a of the X electrode may be formed under the pedestal layer 15, and the intersection portion 2a of the Y electrode may be formed on the pedestal layer 15 as shown in FIG. 3B. A configuration in this case is shown in FIGS. 3A and 3B.

However, as shown in FIGS. 3A and 3B, since it is necessary for both ends of the electrode portion 1b of the X electrode in the extending direction of the X electrode to be formed so as to cover a part of the planarized portion 15a and the side surface 15b of the pedestal layer 15 in terms of manufacturing processes, a reflection region is further increased than that of the configuration shown in FIGS. 1A and 1B, which thus is not preferable. In addition, FIGS. 3A and 3B are diagrams for describing effects of the touch-screen according to the present embodiment.

In addition, although, in the above-described embodiment, the display device with a touchscreen where the touchscreen is provided on the liquid crystal display panel which is an example of the display panel, the present invention is not limited thereto, and may be applied to a display device with a touchscreen where the touchscreen is provided on other display panels such as an organic EL display panel or an inorganic EL display panel.

As above, although the invention made by the present inventor has been described in detail based on the embodiment, the present invention is not limited to the embodiment and may be variously modified without departing from the spirit thereof.

In other words, while there have been described what are at present considered to be certain embodiments of the invention, it will be understood that various modifications may be made thereto, and it is intended that the appended claims cover all such modifications as fall within the true spirit and scope of the invention.

What is claimed is:

1. A touch detection device comprising:
   a substrate with a first electrode running in a first direction and having a first region and a second region facing the first region in the first direction, the first region being separated from the second region with a gap;
   an insulating layer located on a first part of the first region, a first part of the second region, and a part of the gap continuously; and
   a first intersection portion electrically connecting the first region to the second region and continuously covering a top surface of the insulating layer, a side surface of the insulating layer, a second part of the first region, and a second part of the second region, the second part of the first region and the second part of the second region not overlapping the insulating layer,
   wherein the insulating layer does not have a hole that exposes the first electrode,
   the insulating layer has an overlapping area located on one of the first region and the second region and overlapping the first intersection portion, and
   a profile of the overlapping area of the insulating layer has a nonlinear shape in a plan view.

2. The touch detection device according to claim 1, wherein the insulating layer has a first width in the gap and a second width on one of the first region and the second region, the first and second widths being in a second direction perpendicular to the first direction,
   the first width is wider than a width of the first intersection portion in the gap, and
   the second width is narrower than a width of the first intersection portion on the one of the first region and the second region.

3. The touch detection device according to claim 1, wherein a planar shape of the insulating layer is a circular shape in a plan view.

4. The touch detection device according to claim 1, wherein a planar shape of the insulating layer is an elliptical shape in a plan view.

5. The touch detection device according to claim 1, wherein the first intersection portion has a first end and a second end arranged in the first direction, and
   the first end is on the second part of the first region and the second end is on the second part of the second region.

6. The touch detection device according to claim 1, further comprising a second electrode running in a second direction intersecting the first direction,
   wherein the second electrode has a third region, a fourth region facing the third region in the second direction, and a second intersection portion located in the gap and between the third and fourth regions, and
   a part of the second intersection portion overlaps the insulating layer.

7. The touch detection device according to claim 6, wherein a width of the second intersection portion in the first direction is wider than a width of the first intersection portion in the second direction.

8. The touch detection device according to claim 6, wherein a width of the second intersection portion in the first direction is narrower than a width of the third region in the first direction and narrower than a width of the fourth region in the first direction.

9. The touch detection device according to claim 6, wherein the third region, the fourth region, and the second intersection portion are formed in one body.

10. The touch detection device according to claim 6, wherein the second electrode, the first region, and the second region are located at a same layer.

11. The touch detection device according to claim 1, further comprising a second insulating layer on a third part of the first region,
   wherein the insulating layer and the second insulating layer are arranged in the first direction, and
   the first intersection portion does not overlap the second insulating layer.

12. The touch detection device according to claim 11, wherein the first intersection portion is not in contact with the second insulating layer.

13. A touch detection device comprising:
   a substrate with first electrodes running in a first direction and arranged in a second direction intersecting the first direction, each of the first electrodes having a first region and a second region facing the first region in the first direction, the first region being separated from the second region with a gap;

an insulating layer located on a first part of the first region, a first part of the second region, and a part of the gap continuously; and a first intersection portion electrically connecting the first region to the second region and continuously covering a top surface of the insulating layer, a side surface of the insulating layer, a second part of the first region, and a second part of the second region, the second part of the first region and the second part of the second region not overlapping the insulating layer, wherein the insulating layer does not have a hole that exposes the first electrode, the insulating layer has an overlapping area located on one of the first region and the second region and overlapping the first intersection portion, and a profile of the overlapping area of the insulating layer has a nonlinear shape in a plan view.

14. The touch detection device according to claim 13, wherein the insulating layer has a first width in the gap and a second width on one of the first region and the second region, the first and second widths being in the second direction, the first width is wider than a width of the first intersection portion in the gap, and the second width is narrower than a width of the first intersection portion on the one of the first region and the second region.

15. The touch detection device according to claim 13, wherein the first intersection portion has a first end and a second end arranged in the first direction, and the first end is on the second part of the first region and the second end is on the second part of the second region.

16. The touch detection device according to claim 13, further comprising second electrodes running in the second direction and arranged in the first direction, wherein each of the second electrode has a third region, a fourth region facing the third region in the second direction, and a second intersection portion located in the gap and between the third and fourth regions, and a part of the second intersection portion overlaps the insulating layer.

17. The touch detection device according to claim 13, wherein a width of the second intersection portion in the first direction is wider than a width of the first intersection portion in the second direction.

18. The touch detection device according to claim 13, wherein the third region, the fourth region, and the second intersection portion are formed in one body, and the second electrodes, the first region, and the second region are located at a same layer.

19. The touch detection device according to claim 13, further comprising a second insulating layer on a third part of the first region, wherein the insulating layer and the second insulating layer are arranged in the first direction, and the first intersection portion does not overlap the second insulating layer.

20. The touch detection device according to claim 19, wherein the first intersection portion is not in contact with the second insulating layer.

* * * * *